US008261247B2

(12) United States Patent
Arnold

(10) Patent No.: US 8,261,247 B2
(45) Date of Patent: Sep. 4, 2012

(54) METHOD OF MODIFYING CODE OF A RUNNING COMPUTER PROGRAM BASED ON SYMBOL VALUES DISCOVERED FROM COMPARISON OF RUNNING CODE TO CORRESPONDING OBJECT CODE

(75) Inventor: Jeffrey Brian Arnold, Cambridge, MA (US)

(73) Assignee: Oracle International Corporation, Redwood City, CA (US)

( * ) Notice: Subject to any disclaimer, the term of this patent is extended or adjusted under 35 U.S.C. 154(b) by 1008 days.

(21) Appl. No.: 12/243,954

(22) Filed: Oct. 1, 2008

(65) Prior Publication Data

US 2010/0083224 A1   Apr. 1, 2010

(51) Int. Cl.
   *G06F 9/44* (2006.01)
   *G06F 9/45* (2006.01)

(52) U.S. Cl. ........ 717/140; 717/141; 717/143; 717/153; 717/169

(58) Field of Classification Search .................... None
See application file for complete search history.

(56) References Cited

U.S. PATENT DOCUMENTS

| 6,928,536 | B2 | 8/2005 | Duesterwald | |
|---|---|---|---|---|
| 7,779,401 | B2* | 8/2010 | Scian et al. | 717/168 |
| 2004/0088679 | A1* | 5/2004 | Grala | 717/110 |
| 2004/0107416 | A1* | 6/2004 | Buban et al. | 717/170 |

OTHER PUBLICATIONS

G. Altekar et al., "OPUS: Online Patches and Updates for Security", Proc. of the 14th USENIX Security Symposium, 2005, p. 19, USENIX Assoc., Berkeley, CA.

A. Baumann et al., "Reboots are for Hardware: Challenges and Solutions to Updating an Operating System on the Fly", 2007, pp. 1-14, USENIX Assoc., Berkeley, CA.

A. Baumann et al., "Providing Dynamic Update in an Operating System", 2005, p. 32, Proc. of the USENIX Annual Technical Conference, USENIX Assoc., Berkeley, CA.

B. Buck et al., "An API for Runtime Code Patching", J. of High-Performance Computing Applications, 14(4), 2000, pp. 317-329, Sage Publications, Inc., Thousand Oaks, CA.

H. Chen et al., "Live Updating Operating Systems Using Virtualization", Proc. of the 2nd ACM Conf. on Virtual Execution Environments, 2006, pp. 35-44, ACM, NY, NY.

K. Makris et al., "Dynamic and Adaptive Updates of Non-Quiescent Subsystems in Commodity Op. Sys. Kernels", Proc. of the 2nd ACM EuroSys. Conf., 2007, pp. 327-340, ACM, NY, NY.

I. Neamtiu et al., "Practical Dynamic Software Updating for C", Proc. of the 2006 ACM Conf. on Programming Language Design and Implementation, 2006, pp. 72-83, ACM, NY, NY.

A. Tamches et al., "Fine-Grained Dynamic Instrumentation of Commodity Op. Sys. Kernels", Proc. of the 3rd OSDI Symp., 1999, pp. 117-130, Usenix Assoc., Berkeley, CA.

* cited by examiner

*Primary Examiner* — Chuck Kendall

(74) *Attorney, Agent, or Firm* — Osha Liang LLP

(57) ABSTRACT

In a method of modifying code of a running computer program so as to modify the running computer program without having to restart the running computer program for changes to the running computer program to take effect, the improvement is disclosed of: (a) comparing differences in the running program's running binary code versus object code produced by compiling the running program's source code and (b) using the results of step (a), determining what values to use for symbols in said changes to the program. The compiling may be performed using either the compiler originally used to compile the running program or a different compiler. A data storage medium having instructions stored therein for a computer to perform the improved method is also disclosed.

19 Claims, 2 Drawing Sheets

METHOD OF MODIFYING CODE OF A RUNNING COMPUTER PROGRAM BASED ON SYMBOL VALUES DISCOVERED FROM COMPARISON OF RUNNING CODE TO CORRESPONDING OBJECT CODE

BACKGROUND OF THE INVENTION

When software developers correct a problem in the source code of a computer program (such as an operating system kernel), they typically create and distribute a patch, which consists of a set of changes to the source code. Software vendors or system administrators apply the patch to their copy of the source code, build a new binary copy of the computer program, and then distribute that new binary program to servers and end-user machines. The updated program must then be restarted in order to benefit from the update. Restarting programs in order to update them can cause undesirable disruption.

A "hot update" changes a running program without restarting it. Existing hot update systems that are designed to update "legacy binaries" (i.e., mostly-unmodified binaries that are created with essentially no foresight of the update system) rely on a programmer to write source code files with certain properties (e.g., as in LUCOS and DynAMOS), or the systems cannot achieve safety guarantees or determine what values to use for ambiguous symbols without a programmer laboriously inspecting the running program (e.g., as in OPUS).

BRIEF SUMMARY OF THE INVENTION

The present invention is an improved method for safely performing hot updates to computer programs. Specifically, the present invention is a technique that, when performed as part of the hot update process, improves the safety of the hot update process and allows the hot update process to determine what values to use for ambiguous symbols, which other hot update systems either cannot handle or can only handle with significant human programmer intervention.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

As used herein, the term "computer program" or "program" refers to any computer program, including an operating system kernel.

Although performing an arbitrary source code change as a hot update is not feasible without a programmer writing new code to perform the transition, some patches can safely be performed as a hot update based solely on the source code differences. Specifically, sufficient information exists for a hot update when a patch does not make semantic changes to data structures—that is, changes that would require existing instances of program data structures to be transformed (e.g., a patch that adds a field to a global data structure would require the existing data structures to change).

The improved method of the present invention can be used to apply any source code patch that does not require semantic changes to data structures (i.e., that only makes changes to program executable text), including patches to assembly files. Unlike other hot update techniques, the improved method requires as input only a source code patch and the running program's source code, and it updates the running program correctly, with no further human assistance required.

The improved method of the present invention does not require any preparation before the to-be-updated program is originally started. The running program does not need to have been specially compiled, for example. Other hot update techniques require a special program design (e.g., as in K42), require a customized compiler (e.g., as in OPUS and Ginseng), or require a virtual machine monitor (e.g., as in LUCOS).

To apply a source code patch, all of the functions that the patch changes are replaced. If any code within a function is patched, then the entire function is replaced. A function is replaced by the patched version of the function being linked into the program's address space and all callers of the obsolete function being caused to invoke the patched version. Entire functions are replaced since they tend to have a well-defined entry point, at the beginning of the function, which is convenient for redirecting execution flow away from an obsolete function to a replacement function.

Although replacing entire functions is relatively convenient, this replacement must be done with care. In particular, this replacement involves generating object code for the patched functions and determining what values to use for symbols in the object code of the patched functions. Next will be discussed how these operations are performed.

Figure 1:
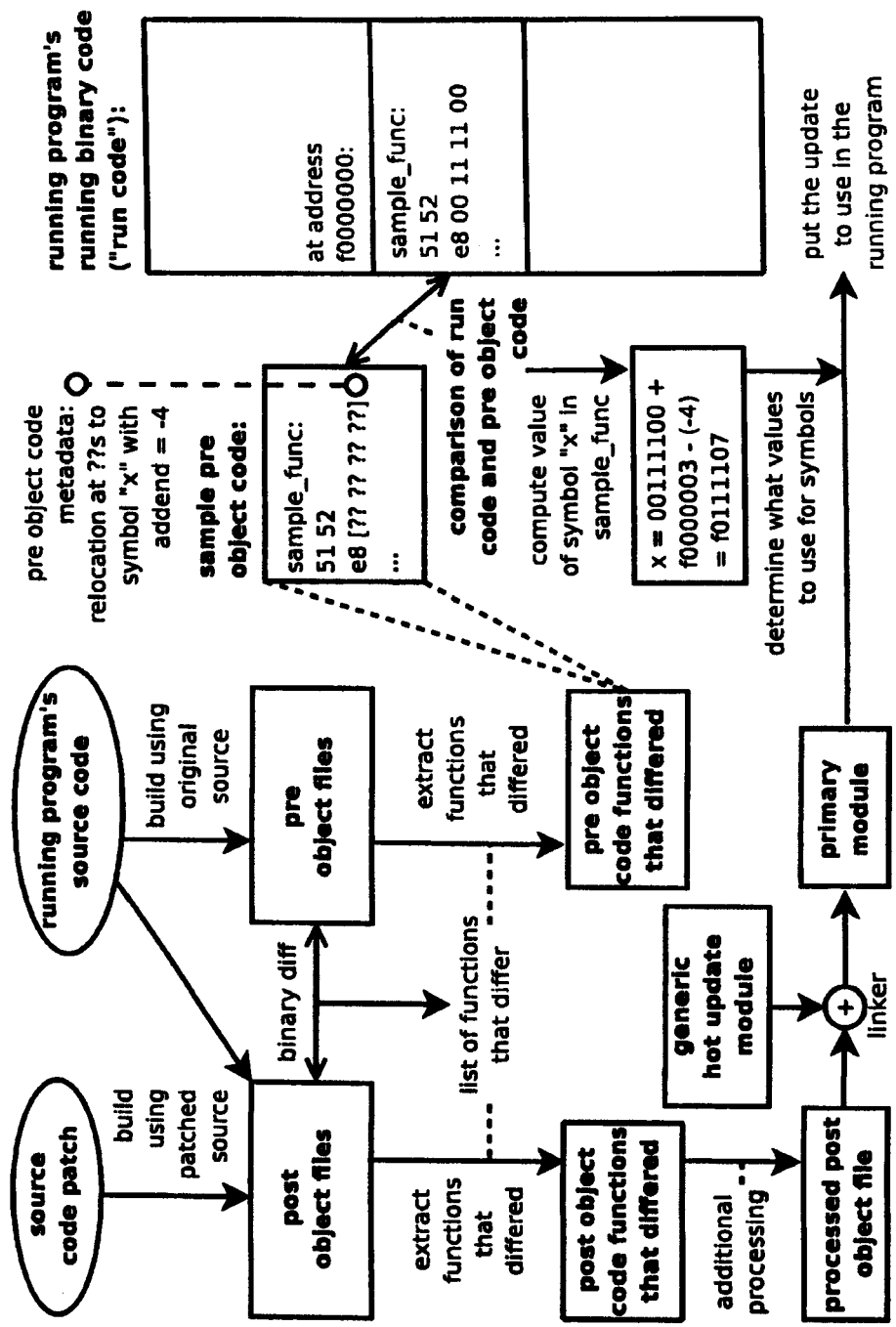
FIG. 1 illustrates a process for automatically creating a hot update from a source code patch using the method of the present invention.

As shown in FIG. 1, a source code patch and the running program's source code are accepted as input. Using a multi-step process, these inputs are used to create a module (termed "the primary module") that contains the patched functions. Most of the steps of this process make few assumptions about the underlying operating system. The design assumes a reasonable binary format for object code and a basic facility for loading modules into the program (such as the kernel module facility provided by the Linux, BSD, and Solaris operating systems for loading modules into the kernel program). In order to make the following examples specific, it will be assumed in the discussion that the object code format is the Executable and Linkable Format (hereinafter "ELF"), which is widely used by the Linux, BSD, and Solaris operating systems.

In order to generate a hot update, it must be determined what code within the program has been changed by the source code patch. This analysis is performed at the ELF object code layer, rather than at the C source code layer.

In order to understand the effect of a source code patch on the program, two builds (i.e., compilations) of the program are performed, and the differences between the resulting object files are examined. First, the running program's source code is built in a directory tree. As used below, the term "pre object file tree" refers to this directory tree containing the running program's source code, the term "pre object files" refers to the object files in that tree, and the term "pre object code" refers to the code in the pre object files. Next, the pre object file tree is copied into a new location, and the source code patch is applied to this copy. As used below, the term "post object file tree" refers to this patched directory tree, the term "post object files" refers to the object files in that tree, and the term "post object code" refers to the code in the post object files. The post object file tree is then built, which recompiles any object files for which the constituent source files have been changed by the source code patch. The contents of the pre object files and the contents of the post object files are compared in order to determine which functions were changed by the source code patch. The changed functions are extracted from the post object file tree and put into an object file (hereinafter termed the "processed post object file").

A module for the update (the "primary module") is then created by using a standard C linker to combine the processed post object file with a generic module for performing hot updates ("generic hot update module"). A system administrator will eventually be able to put the update to use in the program by loading the primary module into the program. After the hot update has been loaded and initialized, the hot update will locate code entry points in the running program's memory and insert trampolines (ump instructions) at those locations. These trampolines will direct execution away from the obsolete code to new code, located elsewhere, that has been loaded into program memory as part of the hot update.

The primary module is not machine-specific and may be used on any computer running a version of the program compiled from the same source code. The patch can easily be reversed by executing a user space utility that communicates with the module. Reversing the patch involves removing the trampolines so that the obsolete function text is once again executed.

The described design must address several challenges in order to be practical. Next will be discussed these challenges and how the present invention addresses these challenges.

1. Compiler differences must be handled. The compiler used to generate the hot update might not behave the same as the compiler used to compile the running program. The pre object code could therefore be different from the code in the running program. As used below, the term "run code" refers to the running program's running binary code. The differences between the pre object code and the run code could cause various serious problems with the hot update process, such as causing the hot update to neglect to update sections of obsolete code. Consider the situation in which a patched function (patched_func) is called from a non-patched function (calling_func) that is within the same compilation unit. Assume that, in the run code, the compiler decided to inline the call to patched_func in calling_func. If, in the pre object code and post object code, the compiler chooses to have calling_func perform a call to patched_func rather than making the call be inline, then the pre object code and post object code for calling_func will be identical. As a result, a naive hot update system would not think that calling_func needs to be replaced in the running program. One would not expect this kind of situation to arise often, but silently failing to update sections of obsolete code is unacceptable even in rare circumstances.

2. Ambiguous symbols must be handled. In order to apply changes to a program, a hot update system must, using some method, determine what values to use for all symbols in said changes to the program. As defined herein, "determining what values to use for symbols in said changes to the program" refers to the process of selecting a numerical value for each symbol (including, for example, function symbols and data structure symbols) so that those numerical values can be used in the new program code associated with the update. Attempting to determine what values to use for symbols based on symbol names in the program's symbol table can commonly cause problems when a symbol name appears more than once or does not appear at all. For example, the replacement code might reference a function by the name translate_table, and two or more local symbols with that name might appear in the program symbol table. In this situation, the hot update system needs a way of determining which translate_table address should be used to fulfill this relocation.

The present invention can be used to solve both the ambiguous symbol problem and the compiler variation problem. The compiler variation problem arises because of unexpected and undetected differences between the run code and the pre object code. The present invention avoids failing silently in this situation by adding a step to the hot update process to compare the run code against the pre object code. Specifically, it might be problematic to perform the update if there is a difference between the run code and the pre object code in the program compilation units that are being modified by the hot update.

During the process of comparing the run code against the pre object code, the hot update system can also gain information about symbols that it was previously having difficulty mapping to addresses because of the ambiguous symbol problem. The run code contains all of the information needed to fulfill the relocations for the pre object code.

The improved method of the present invention passes over every byte of the pre object code, making sure that the pre object code corresponds to the run code. When this comparison of the run code and pre object code comes to a word of the pre object code in memory that is unknown because of a relocation entry in the pre object code, the present invention can compute the correct value of the relocation entry's symbol based on the corresponding run code bytes in memory.

For example, consider a situation in which the pre object code contains a function that calls translate_table, but two local symbols with that name appear in the program. The pre object code generated by the compiler will, as in all relocation situations, not contain a final translate_table address at the to-be-relocated position. Instead, the pre object code's metadata (i.e., the table of relocation information for the pre object code, which is stored alongside the pre object code) will know that a symbol name (translate_table) and an "addend" value are associated with that to-be-relocated position in the pre object code. The "addend" is an offset chosen by the compiler to affect the final to-be-stored value. For x86 32-bit relative jumps, this addend value is often −4 to account for the fact that the x86 jump instructions expect an offset that is relative to the starting address of the next instruction. The ELF specification says that, in this situation, the to-be-relocated position's final value in memory will be computed from the addend (A), the translate_table symbol value (S), and the final address (P) of the to-be-relocated position. Specifically, this position will take on the value A+S−P.

When the improved method of the present invention gets to the to-be-relocated location in the pre object code, it will note that this relocation has not yet been fulfilled, and it will examine the run code in order to gain the information needed to fulfill it. The run code contains the already-relocated value (hereinafter termed "val"), which is val=A+S−$P_{run}$. The improved method also knows the address of that position in memory in the run code ($P_{run}$). The pre object code metadata contains the addend A, and so the symbol value can be computed as S=val+$P_{run}$−A.

By computing symbol values in this manner, the present invention can use the results of the comparison between the run code and the pre object code to determine what values to use for symbols in the changes to the program (i.e., the primary module). Once the value of a symbol has been determined, that value can be used in the changes to the program (i.e., the primary module) using the standard computer software relocation process by which any symbol value is plugged into relocatable executable code.

The present invention's comparison between the pre object code and the run code will now be discussed in regard to FIG. 1. All of the numbers in FIG. 1 and in the following discussion of FIG. 1 are written in base 16. FIG. 1 shows some sample pre object code taken from the pre object code functions that differed. This sample pre object code contains the function "sample_func" with contents "51 52 e8" followed by a four-byte relocation to symbol "x" with addend "−4" (information about this relocation is stored in the pre object code metadata, which is stored alongside the pre object code). FIG. 1 shows some corresponding sample run code containing the function "sample_func" at address f0000000 with contents "51 52 e8 00 11 11 00". In this situation, the present invention's comparison of run code and pre object code for the function "sample_func" would be able to compute the value of the symbol "x" in "sample_func" based on the equation provided above, $val = A + S - P_{run}$, which can be rearranged to read $S = val + P_{run} - A$. In this example, the already-relocated value "val" in the run code is "00 11 11 00", so val=00111100. The address of the already-relocated value in memory "$P_{run}$" is three bytes after f0000000, so $P_{run}$=f0000003. In this example, the addend of the relocation to the symbol "x" is −4, so A=−4. The value of the symbol "x" in "sample_func" can therefore be computed as $S = val + P_{run} - A = 00111100 + f0000003 - (-4) = f0111107$. After this value has been computed, it can be used to determine symbol values in the changes to the program (i.e., the primary module).

Although the present invention does not require that the hot update be prepared using exactly the same compiler and assembler version that were used to compile and assemble the running program, doing so is advisable since the improved method of the present invention will, in order to be safe, abort the upgrade if it detects unexpected binary code differences.

Figure 2:
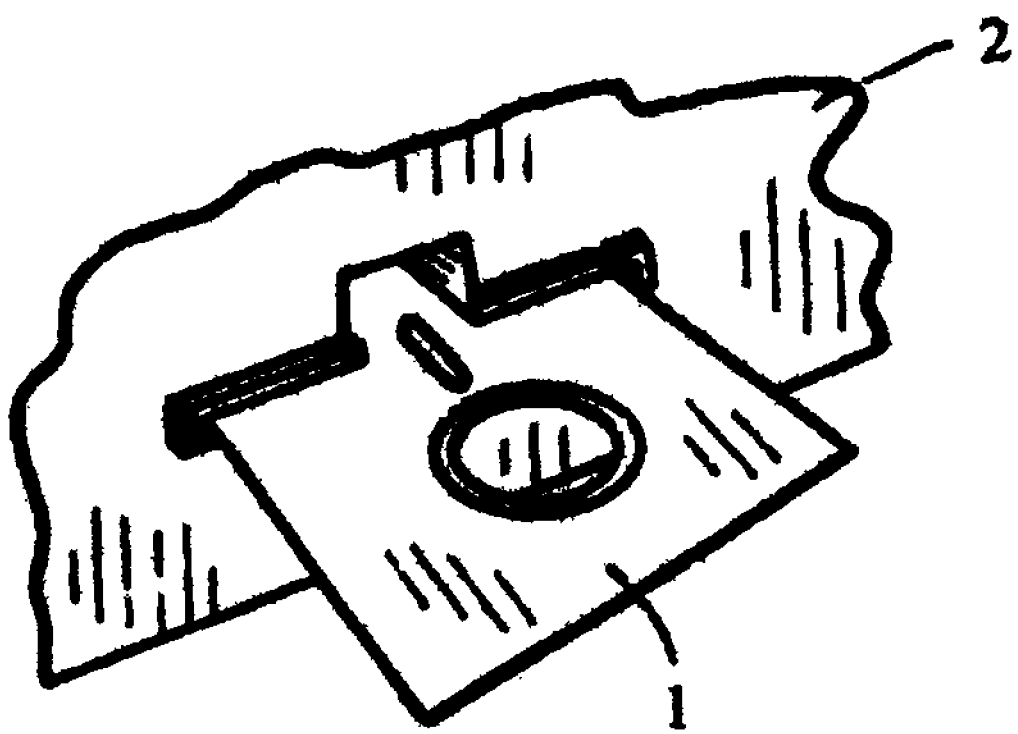
FIG. 2 illustrates a data storage medium having instructions stored therein for a computer to perform the method of the present invention.

FIG. 2 illustrates a data storage medium 1 having instructions stored therein for a computer 2 to perform the method of the present invention The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A method of modifying code of a running computer program comprising:
   obtaining pre-patch object code by compiling, using a first compiler, unpatched source code of the running computer program;
   obtaining post-patch object code by compiling patched source code using the first compiler, wherein the patched source code comprises the unpatched source code and a source code patch;
   comparing the pre-patch object code and the post-patch object code to obtain a changed object file;
   obtaining a relocated value in the running computer program by comparing the running binary code of the running computer program and the pre-patch object code;
   calculating a symbol value using the relocated value in the running computer program; and
   modifying the running computer program using the symbol value and the changed object file.

2. The method of claim 1, wherein the running computer program was compiled from the unpatched source code using the first compiler.

3. The method of claim 1, wherein the running computer program was compiled from the unpatched source code using a second compiler different from the first compiler.

4. A non-transitory computer readable medium comprising instructions that, when executed by a processor, perform a method for modifying code of a running computer program, the method comprising:
   building pre-patch binary code by compiling, using a first compiler, pre-patch source code;
   building post-patch binary code by compiling patched source code using the first compiler, wherein the patched source code comprises the unpatched source code and a source code patch;
   comparing the pre-patch binary code and the post-patch binary code to obtain a changed object file;
   obtaining a relocated value in the running computer program by comparing the running binary code of the running computer program and the pre-patch binary code
   calculating a symbol value using the relocated value in the running computer program; and
   modifying the running computer program using the symbol value and the changed object file.

5. The non-transitory computer readable medium of claim 4, wherein building pre-patch binary code by compiling the pre-patch source code includes building the pre-patch source code in a pre-patch object file directory tree.

6. The non-transitory computer readable medium of claim 5 wherein building the post-patch binary code by compiling the patched source code comprises:
   creating a copy of the pre-patch object file directory tree into a new location; and
   applying the source code patch to the copy of the pre pre-patch object file directory tree.

7. The non-transitory computer readable medium of claim 5 wherein building the post-patch binary code by compiling the patched source code further comprises:
   building a post-patch object file tree.

8. The non-transitory computer readable medium of claim 7 wherein comparing the pre-patch binary code and the post-patch binary code to obtain the changed object file comprises:
   comparing contents of the pre-patch object file tree and contents of the post-patch object file tree to determine a list of functions changed by the source code patch.

9. The non-transitory computer readable medium of claim 8 wherein comparing contents of the pre-patch object file tree and contents of the post-patch object file tree is performed at an executable and linking format (ELF) object code layer.

10. The non-transitory computer readable medium of claim 7 wherein comparing the pre-patch binary code and the post-patch binary code to obtain the changed object file comprises:
    extracting changed functions from the post-patch object file tree;
    inserting the changed functions into the changed object file; and
    creating a primary update module by linking the changed object file with a generic hot update module.

11. The non-transitory computer readable medium of claim 4 wherein the running computer program was compiled from source code using a second compiler different from the first compiler.

12. The non-transitory computer readable medium of claim 10, the method further comprising:

loading the primary update module;
initializing the primary update module,
locating code entry points in a memory used by the running computer program; and
inserting trampolines at the code entry points locations.

13. The non-transitory computer readable medium of claim 12, the method further comprising:
reversing the modification of the running computer program by executing a user space utility that communicates with the primary update module; and
removing the trampolines.

14. The non-transitory computer readable medium of claim 10, wherein the primary module is machine-independent and is operable to patch a computer running a version of a program compiled from the pre-patch source code.

15. The non-transitory computer readable medium of claim 10 wherein calculating the symbol value using the relocated value in the running computer program comprises:
inserting the symbol value into the primary update module.

16. The non-transitory computer readable medium of claim 15, wherein symbol values obtaining the relocated value in the running computer program by comparing the running binary code of the running computer program and the pre-patch binary code comprises:
passing over every byte of the pre-patch binary code to determine that the pre-patch binary code corresponds to the running binary code.

17. The non-transitory computer readable medium of claim 16, wherein the method further comprises computing the relocated value of a relocation entry based on corresponding run code bytes in memory.

18. The non-transitory computer readable medium of claim 4, wherein calculating the symbol value using the relocated value in the running computer program comprises:
determining the symbol value based on the relocated value in the running computer program, an address of the relocated value in memory, and an addend obtained from the pre-patch binary code.

19. The non-transitory computer readable medium of claim 4, the method further comprising aborting operation when unexpected binary code differences are detected.

* * * * *

UNITED STATES PATENT AND TRADEMARK OFFICE
CERTIFICATE OF CORRECTION

| | |
|---|---|
| PATENT NO. | : 8,261,247 B2 |
| APPLICATION NO. | : 12/243954 |
| DATED | : September 4, 2012 |
| INVENTOR(S) | : Arnold |

It is certified that error appears in the above-identified patent and that said Letters Patent is hereby corrected as shown below:

In column 3, line 17, delete "(ump" and insert -- (jump --, therefor.

In column 5, line 41, after "invention" insert -- . --.

In column 6, line 37, in Claim 6, after "the" delete "pre".

Signed and Sealed this
Eighteenth Day of December, 2012

David J. Kappos
*Director of the United States Patent and Trademark Office*